April 14, 1970   L. F. PERRY ET AL   3,506,038
WIDE RANGE VOLUME CONTROLLER
Original Filed March 29, 1967
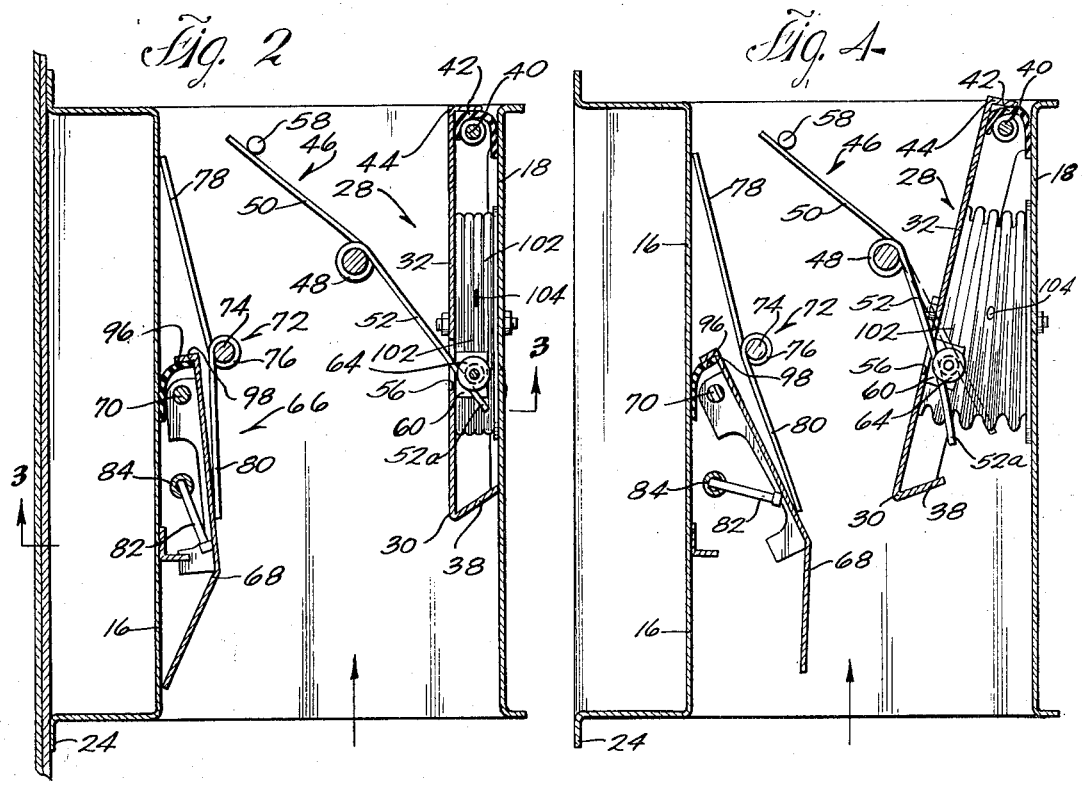
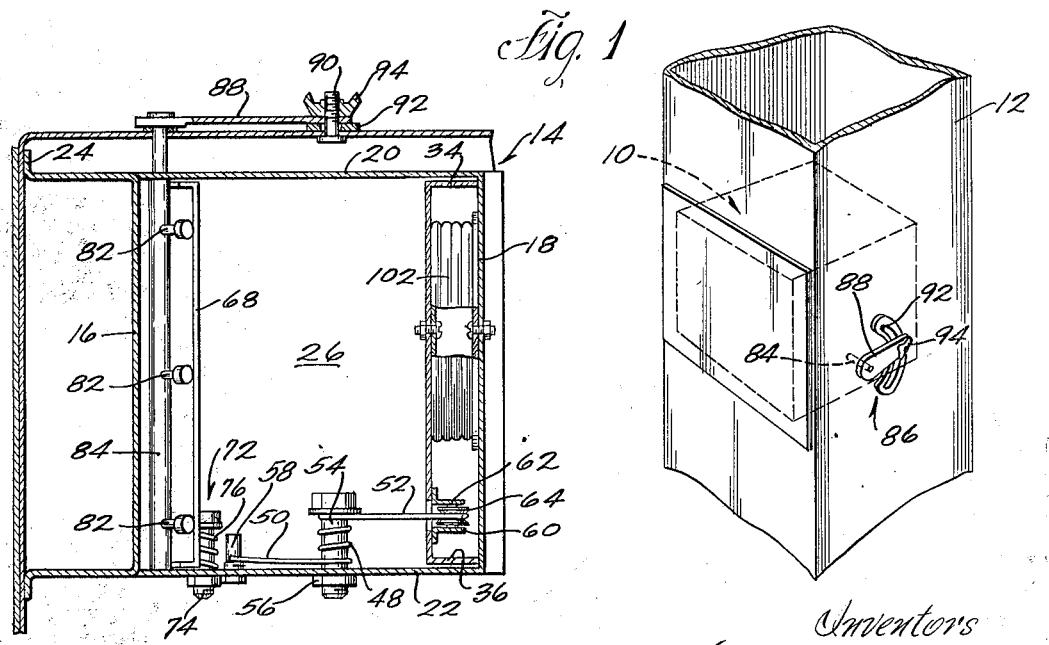
Inventors
Geo. F. Perry
Joseph W. Spradling
By Joseph A. Smith
Attorney United States Patent Office 3,506,038
Patented Apr. 14, 1970

3,506,038
WIDE RANGE VOLUME CONTROLLER
Leo F. Perry, Fort Atkinson, and Joseph W. Spradling, Madison, Wis., assignors to Wehr Corporation, Milwaukee, Wis., a corporation of Wisconsin
Continuation of application Ser. No. 626,847, Mar. 29, 1967. This application Feb. 10, 1969, Ser. No. 806,769
Int. Cl. F15d 1/02; F24f 13/10; F16k 21/04
U.S. Cl. 138—45          22 Claims

ABSTRACT OF THE DISCLOSURE

This disclosure is directed to the use of a torsion spring to determine the operating characteristics of the pressure responsive valve mechanism which functions to maintain a relatively constant volume of flow through a terminal control unit. The torsion spring is used to take advantage of its ability to exert an increasing force in opposition to an applied force as the point of application of that force is moved along the projecting arm of the spring nearer the coiled body of the spring so that a single spring can be used to establish usable operating characteristics over a wide range of flow values and encountered pressures. Furthermore, this disclosure is directed to the arrangement of an additional adjusting mechanism in the passage, in which the pressure responsive valve operates, in such a manner that its position in the passage can be adjusted to vary the effective cross sectional area of the passage in which the pressure responsive valve operates to thereby determine a desired volume of flow.

This is a continuation of Ser. No. 626,847, filed Mar. 29, 1967.

BACKGROUND OF INVENTION

Field of invention

This invention relates to constant volume flow controls of the type used to maintain a relatively constant rate of discharge from a terminal unit of an air distribution system or the like and, more particularly, to extending the operational range of constant volume controls of this type.

Description of prior art

Constant volume flow controls of various constructions and as incorporated in a terminal control unit are well known in this art. In accordance with accepted practices, the volume conrol includes a valve member which is arranged in the path of air flow and moves, against a biasing force, in response to pressure variations to vary the obstruction offered to air flow and adjust for variations in flow rate due to such pressure variations. Generally the obstruction to air flow is increased as pressure increases and the valve operates against a suitably arranged spring, an example of this type of arrangement is illustrated in U.S. Patent No. 3,250,203 of Joseph W. Spradling and Gordon C. Sylvester which is assigned to the assignee of this application.

Generally one of the primary elements in determining the operating characteristics of a volume flow control is the spring against which the valve moves. One shortcoming of prior volume controls is that, with a particular spring, the control is only effective over a relatively narrow range of flow rates. When rates outside of that range are to be accommodated, it is necessary to change the spring since prior spring arrangements exhibit usable characteristics only in a given narrow range of flow rates. In one example of a type of prior unit intended to operate in three different ranges 325–400 c.f.m. (cubic feet per minute), 375–450 c.f.m. and 425–500 c.f.m. (i.e. low, medium and high volume operation, respectively), a different spring is required for operation in each of the three different ranges. This limits the scope of application of any given unit for in order to adapt a unit for use from one range to another, it is necessary to dismantle the control and replace the biasing spring with one having the characteristics necessary for the new range. Since the terminal control units are generally in an enclosed delivery system and the spring is a part of the volume control within that unit, the springs are not readily accessible and this replacement of springs cannot be achieved conveniently and is generally an involved and time consuming operation. Furthermore, fabrication of the terminal control units or the volume flow controls per se is complicated in that it is necessary to assemble and/or stock parts for a variety of volume controls with different characteristics to insure availability for use in the various operational ranges.

SUMMARY OF THE INVENTION

This invention proposed to oppose movement of the constant flow maintaining valve with a spring which has a supported portion and an elongated spring arm extending from the supported portion and terminating in an end which is movable relative to the supported portion. Preferably the spring end is free and unsupported. The spring arm and valve are arranged so that engagement therebetween occurs along the length of the spring arm with the point of engagement, and hence the point of application of a biasing force to the valve, varying along the spring arm as the valve moves in accordance with pressure variations in the passage, or more specifically pressure variations across the valve. As this pressure increase occurs air flow tends to increase and the valve moves to compensate for this increased flow by further obstructing the flow passage, and in so doing this point of engagement moves toward the supported end of the spring arm. As the point of engagement of the valve with the spring moves toward the supported spring end, the biasing force opposing valve movement increases to thereby provide an increasing biasing force to oppose the increasing force being applied to the valve. With this arrangement a single spring is capable of providing effective operating characteristics throughout a wide range of flow rates or volume delivery encompassing the various ranges normally encountered in conventional operation and requiring spring changes. Preferably, this invention proposes the use of a torsion spring which has a coiled body portion and an elongated spring arm having a free and unsupported end, the spring arm extending from the coiled portion and engaging the valve member. The body of the torsion spring is held against rotation so that movement of the spring arms tends to produce angular displacement of the body. The characteristics of the torsion spring are such that its coiled body exhibits a given resultant torque for a given angular displacement. In addition, with an elongated spring arm extending from the coiled body and providing the element through which the angular displacement force is applied to the coiled body, a further factor is introduced into the spring system, namely the deflection which occurs in the spring arm itself in response to application of a force to the arm. When a force is applied to the spring arm, a portion of that force is spent in deflection of the spring arm so that only a portion of the applied force is available to provide angular displacement of the coiled body. Thus the angular displacement and resultant torque exerted by the torsion spring is reduced by the deflection factor. As the point of force application moves away from the free end of the spring arm and toward the coiled body, less spring arm deflection occurs and a greater portion of the applied force exerted by the valve member acts directly against the coiled body and the angular displacement produced in the coiled body increases. Accordingly, the force exerted on the torsion spring by the valve member increases as the pressure increases, but this is also accompanied by movement of the point of engagement of the valve member on the spring arm nearer the supported end to increase angular displacement of the coiled body and the force opposing valve member movement. This provides wide range control with a single spring since, as the pressure encountered and the forces on the spring increase, the point of engagement on the spring arm is moved nearer the coiled body thereby decreasing the amount of spring arm deflection and increasing the amount of angular displacement of the coiled body and correspondingly increasing the spring forces acting on the valve. Referring back to the above mentioned example of a prior art unit where it was noted that three different springs were required to provide control in the low, medium and high ranges set forth, namely 325–400, 375–450 and 425–500 c.f.m., with this invention, and in a corresponding application, a single torsion spring has provided usable operating characteristics over a range including these three different ranges and has in fact extended that range in that it has provided for adequate control over a range of 250–500 c.f.m.

The volume control of this invention also includes other points of improvement. It achieves adjustment of the control point of the unit by varying the cross sectional area of the passage in which the constant volume control valve operates; preferably this is accomplished by mounting an additional valve mechanism in the vicinity of the constant volume control valve and supporting it for movement to adjust the amount of the passage it obstructs. Also, provision is made to reduce the tendency for the valve to resonate in the system and this is accomplished by providing a suitable damper mechanism which retards valve movement in the event of either a sudden drop or rise in pressure. Furthermore, transference of forces between the constant volume control valve and spring is optimized by reducing friction at the point of engagement of the valve with the spring.

DESCRIPTION OF DRAWINGS

FIG. 1 is a generally schematic illustration of a volume control mounted in the housing of a terminal discharge unit;

FIG. 2 is a section view through the constant volume control taken along a plane generally parallel to air flow;

FIG. 3 is a section view generally along line 3—3 of FIG. 2; and

FIG. 4 is a section view similar to FIG. 2 but illustrating the valve elements of the control displaced from the positions of FIG. 2.

Volume controls constructed in accordance with this invention can be used as the control element in virtually any gaseous medium flow system where it is desired to maintain flow at a constant volume. However, the primary application of this invention is perhaps found in terminal discharge or control units of an air distribution system and, for that reason, the invention will be discussed as though incorporated in such an environment.

With particular reference to the drawings, volume control 10 is illustrated as mounted in a terminal control unit, only a portion 12 of the unit housing being illustrated in the drawings. The details of the terminal control unit form no part of this invention and are not necessary to an understanding thereof and for that reason the unit has not been illustrated in detail. For example, the volume control of this invention can be incorporated in a terminal control unit such as that disclosed and claimed in the above identified Spradling et al. patent and reliance is hereby placed on that patent should a complete description of a terminal control unit become necessary.

The volume control includes a generally rectangular in cross section housing 14 consisting of pairs of opposed walls 16, 18 and 20, 22. Wall 16 is generally dished and includes a peripherally extending flange 24 which affords a structure through which the volume control can be attached to housing 12. The volume control is generally connected in the housing so that air flow through passage 26, defined by walls 16, 18, 20 and 22, is in the direction of the arrow illustrated in FIGS. 2 and 4. Valve mechanism 28 is positioned within passage 26 and includes a rigid valve blade 30, preferably metallic and having a generally rectangular configuration. More particularly, the valve blade consists of a rectangular base plate 32 provided with turned side portions 34 and 36 and a turned end portion 38 which is disposed at an acute angle with respect to plate 32. Plate 32 and angular end 38 define a marginal edge of the blade plate which is presented to air flow in passage 26.

The valve blade is supported for pivotal movement in passage 26 by rod 40 extending through side portions 34 and 36 and fixed in walls 20 and 22. As will be discussed more completely hereinafter, the valve blade normally assumes the position illustrated, against wall 18, and is moved in a clockwise direction about rod 40 in response to variations in the pressure drop in passage 26 across the valve blade. The angular position of valve blade 30 in passage 26 determines the amount of obstruction to air flow through the passage and correspondingly the volume of air flow. In order to increase the response of valve blade 30 to pressure variations, and to minimize leakage past the valve blade, a sealing boot 42 of suitable material such as neoprene is provided at the downstream end of valve blade 30. Boot 42 is supported on valve blade 30 upstream of flange 44 and extends over rod 40, as illustrated in FIG. 2, and engages wall 18 to thereby provide a substantially sealed downstream end for the valve blade. Increased pressure across the valve blade enhances the seal at the boot by urging boot 42 against flange 44 and wall 18 thereby affording a pressure-assisted seal. With this arrangement air flow through passage 26 will tend to displace valve blade 30 from wall 18 and pressure will build up between valve blade 30 and wall 18 so that the valve blade moves in the passage in accordance with that pressure to vary the flow rate through the passage.

In order to attribute usable characteristics to valve mechanism 28 so that accurate volume control can be achieved valve blade movement in response to pressure variations in passage 26 is generally opposed by a suitable spring member. This invention is concerned with the arrangement for opposing valve blade movement. As illustrated, the biasing spring of the valve mechanism preferably takes the form of a torison spring 46. Structurally the torsion spring includes a body 48 made up of a plurality of coils and terminating in arms 50 and 52 and being wound in a counterclockwise direction from arm 52 to 50. Coiled body 48 is supported on post 54, as illustrated the post is in the form of a headed bolt anchored in wall 22 by a nut 56. Arm 50 engages a post 58 which is also fixed to wall 22. Arm 53 extends from body 48 toward valve blade 30 with the terminal end of arm 52 being substantially free and unsupported other than at its point of engagement with valve blade 30 so that it is capable of moving with respect to the coiled body. More particularly, arm 52 extends through an aperture 56 in valve plate 32 and engages a roller 64 that is supported between brackets 60 and 62 fixed to valve plate 32. With this arrangement the torsion spring is held against rotation by engagement of arm 50 with post 58 and clockwise motion of valve blade 30 is opposed by the biasing force of the torsion spring.

As the valve blade moves in a clockwise direction it also moves arm 52 in a clockwise direction and tends to wind body 48 clockwise about post 54. In order to displace valve body 30 angularly in a clockwise direction the bias on the torque of the coiled body must be overcome and a given amount of angular displacement of the coiled body must occur to permit the valve to move angularly. In this respect the use of a torsion spring is particularly desirable since the coiled body provides a relatively constant source of biasing force and one which does not vary appreciably in a relatively wide range of movement or at least in a range of movement corresponding to movement of valve blade 30. It has been discovered that by using a torsion spring such as that illustrated a single spring can be utilized to provide the necessary biasing force over a wide range of operational flow rates. With the illustrated arrangement, wherein the free end 52a is unsupported, it has been observed that an additional factor is introduced into the spring system, namely the deflection of the spring arm which occurs when the force resulting from valve blade movement is applied to the spring arm. The torsion spring arm 52 is generally flexible, preferably being characterized by a uniform, relatively thin cross section. The configuration and size of the spring can be varied to produce the desired spring characteristics.

This additional factor of deflection and its significance in the spring system will now be discussed. As illustrated, the torsion spring through arm 52 normally biases valve blade 30 in the position illustrated in FIG. 2, namely in engagement with wall 18. In this position roller 64 is engaged near the free end 52a of the spring arm. While the point of engagement with arm 52 is near its free end 52a, the arm is more susceptible to deflection about the coiled body and the amount of angular displacement of the coiled body which will be produced by a given force will be reduced so that the torsional force exerted by the spring under such conditions is less than if the arm were perfectly rigid and all of the applied force were to be available to produce angular displacement of the coiled body. An example of the deflection which occurs is illustrated in FIG. 4 where the normal position of arm 52 is illustrated in dotted lines. It was further observed that as the point of engagement on the spring arm is moved toward the coiled body the tendency for arm 52 to deflect decreases and the portion of the applied force tending to angularly displace coiled body 48 increases accordingly. This invention makes use of this characteristic by arranging the valve body and spring so that as the valve body moves in response to increased pressure its point of engagement with spring 52 moves away from free end 52a toward the supported end at coiled body 48. As pressure increases and the forces created thereby increase, the roller 64 is moved correspondingly nearer the supported end of spring arm 52 whereby deflection of the spring arm decreases and a greater portion of the force is expended in angularly displacing the coiled body. This makes an increasingly larger force available from the torsion spring for opposing the increased force being applied by the valve member. During operation of the regulator, the point of engagement between roller 64 and the spring arm is determined by the magnitude of the pressure differential across the valve mechanism so that the roller will engage the spring arm along an appropriate area of the spring arm in the low, medium and high ranges discussed above in connection with prior art controls. In effect, a torsion spring used in the manner disclosed acts as a variable torque rate spring such that its torque rate, expressed in inch-pounds per degree of deflection, increases as the roller moves up the spring arm toward the coiled body of the spring. In this manner the single spring 46 provides adequate biasing force over a wide range. For example, in a typical arrangement of this type constant volume control has been achieved over a range of approximately 250–500 c.f.m. using the same torsion spring 46. It can be seen that this range not only includes the low, medium and high ranges discussed previously but actually extends that range. The range discussed is merely typical for one size unit and this invention can provide the desirable result of extending the overall range in other size units. Generally, the increased range afforded by this invention is such that the lower limit on the operating range will not exceed 50% of the upper limit.

The torsion spring illustrated is preferred as it provides a relatively simple and effective spring construction for achieving the above discussed operation. However, other spring arrangements which offer the same characteristics of varying angular displacement and deflection of a spring arm can be used.

A further advantage of this arrangement is that for a given pressure valve mechanism 28 automatically adjusts to the particular area of contact of the valve member on spring arm 52 so that no external adjustment of the spring member is required. Thus, factory set characteristics can be maintained on the control valve and in-field adjustment is not required.

Generally, provision is made for setting a flow rate at which the unit is intended to control, i.e. to set a control point determining a capacity which valve mechanism 28 is intended to maintain. In accordance with a further aspect of this invention, this is accomplished simply and effectively by varying the dimension, or cross sectional area, of the passage in which valve mechanism 28 operates. Specifically, valve mechanism 66 is supported from walls 20 and 22 in the vicinity of valve mechanism 28. Valve mechanism 66 includes valve blade 68 pivotally supported on rod 70 and in generally opposed relationship with respect to valve blade 30. Valve blade 68 is movable about rod 70 generally toward and away from valve blade 30 and is capable of assuming any one of a number of angular positions in passage 26. Valve blade 68, for all practical purposes, spans the extension between walls 20 and 22 and has a sealed engagement with wall 16 (as will be described more completely hereinafter) so that movement of valve blade 68 about rod 70 results in different obstruction to flow in the passage and in a change in the cross sectional area of the passage in which valve blade 30 is intended to operate. Valve blade 68 is adjustable to provide a basic restriction in passage 28 or in effect to determine a particular cross sectional area for the passage determining a flow rate through the passage which it is valve blade 28's function to maintain at a constant value. At a particular control point determined by the position of valve blade 68, valve mechanism 28 moves within the established passage in response to variations in pressure to maintain the desired flow rate. Thus a simple and effective manner of establishing the control point for the unit is produced by varying the cross sectional area of the passage in which the flow controlling pressure responsive valve is intended to function.

Structurally, movement of valve blade 68 away from wall 16 is opposed by torsion spring 72 supported on a post 74, again in the form of a threaded bolt anchored on wall 22. The coil spring includes a coiled body 76 supported on post 74 and also includes elongated arms 78 and 80. One arm, 78, engages wall 16 and the other arm 80 engages valve blade 68. From arm 80 to arm 78 the spring body is coiled in a clockwise direction so that valve blade 68 is biased into the position illustrated in FIG. 2, namely toward engagement with wall 16. To move outwardly and obstruct passage 26 valve blade 68 must operate against spring 72. The strength of spring 72 is greater than that of spring 46 and such that valve blade 68 can assume a plurality of fixed positions in the passage and will not be affected by the variations in pressure to which valve mechanism 26 is intended to respond. Valve blade 68 is manipulated through an arm 82 pivotally supported in bushing 84 and extending exteriorly of housing 12 to an adjusting mechanism 86. Mechanism 86 includes a movable arm 88 including a pin 90 which is disposed in an arcuate slot 92. Arm 88 can be moved to any position with respect to slot 92 and position blade 68 in a corresponding angular position within passage 26. Wing nut 94 is provided to selectively lock and release the valve blade in position. Suitable calibrations can be provided at adjusting mechanism 88 to assist in adjustment. As illustrated in FIG. 4 valve blade 68 has been moved away from wall 16 and affords partial obstruction of passage 26. The volume of air flow through passage 26 is determined by the spacing between valve blade 68 and the marginal end of valve blade 30. To minimize leakage past valve mechanism 66 a suitable sealing boot 96, of Neoprene or similar material, is provided at the downstream end of the valve mechanism. More particularly, the boot is supported upstream of valve blade flange 98 and extends over rod 70 and into engagement with wall 16, see FIGS. 2 and 4, again affording a pressure-assisted seal at the downstream end of valve mechanism 66.

In this arrangement the volume setting for the terminal control unit can be established by appropriate positioning of valve blade 68. After valve blade 68 has been positioned control valve 30 will move in a clockwise direction in response to increased pressure across the valve to assume the appropriate position on spring arm 52 to maintain the preselected flow volume. Thus valve blade 30 pivots clockwise in response to increased pressure and counter-clockwise under the bias of spring 46 in response to decreased pressure to enlarge or restrict the opening between the two valve blades as may be required to maintain the desired volume of flow.

In a unit of this type it is also found desirable to provide some means for preventing severe response of valve blade 30 to sudden and abnormal drops, or increases, in system pressure. Should any temporary drop of this type occur valve blade 30 would normally be immediately urged to its position in engagement with wall 18 and subsequently, should the pressure increase in a relatively short time the valve blade would again be rapidly urged upwardly to its control position. If this pressure drop and subsequent increase should occur with a definite frequency a resonant condition could be set up in the control valve and this would have a marked detrimental effect on unit operation. To minimize the possibility of occurrence of such a condition, bellows 102 is provided and is connected between the inner side of valve base plate 32 and housing wall 18. The bellows is generally of conventional construction consisting of a relatively flexible body suitably anchored at the valve base plate and wall 18, but is provided with a restricted aperture 104. As the valve moves in a clockwise direction, air is drawn into the bellows through aperture 104. However, should a sudden and abrupt pressure drop occur in passage 26 the air contained in the bellows must be expelled through the restricted opening 104 before the valve blade can return to its normal position. This retards counter-clockwise motion of the valve blade and provides a time delay during which system pressure can be re-established before the valve returns to its normal position against wall 18. This tends to damp the valve blade movement in response to system pressure variations. Abrupt drops in system pressure are not accompanied by immediate return movement of the valve 32 to its normal position and the susceptibility of the control to occurrence of the above mentioned resonant conditions is reduced substantially. Furthermore, the bellows tends to oppose sudden movement of the valve as a result of sudden increase in air pressure thereby affording general overall stability in controller performance.

It should also be noted that by making engagement on spring arm 52 through a roller 64 a low friction connection is maintained between the valve blade and the spring. This achieves a more accurate transference of forces and more precise response of the valve blade and spring arm to such forces. To further optimize this low friction connection it is proposed that roller 64 be made of nylon and supported on ball bearings or the like.

An additional advantage is afforded by the preferred illustrated embodiment in that the operating characteristics of valve mechanism 28 can be varied by varying the relative position of the various support points. For example, the high end of the c.f.m. range can be lowered by moving the initial point of engagement of roller 64 nearer end 52a or it can be elevated by decreasing the spacing. Also, the spring forces can be varied by moving posts 54 and/or 58 with respect to each other and the roller and valve blade pivot. Similarly, the characteristic of valve mechanism 66 can be varied by moving the support point for spring 72 and its points of engagement with wall 16 and valve blade 68. Also, the operating characteristics can be varied by varying the configuration of the free marginal edges of either or both valve blades. Thus, approaches for varying operating characteristics are offered in addition to merely varying the size of the spring.

It will be appreciated that the above discussed constant volume control provides a simple and effective control arrangement for providing wide range volume control with the same basic control elements. The control valve unit can be utilized in any type of application with the overall volume being set by volume control mechanism 66 and the control valve mechanism 28 will automatically assume the appropriate position on spring arm 52 to accommodate that volume and with spring 46 providing the necessary biasing force for effective control. This represents a substantial improvement over prior art arrangements wherein a single control could offer effective control only over a relatively narrow range of flow rates and any deviation from that range required replacement of the constant volume control biasing spring.

We claim:
1. A constant volume flow regulator comprising, in combination:
   means defining a flow passage,
   valve means in said passage,
   means supporting said valve means for movement in said passage in response to pressure in said passage to vary the amount of obstruction offered to flow through said passage by said valve means,
   biasing means having a supported portion and an arm portion extending from said supported portion and terminating in a free and unsupported end.
   and means connecting said biasing means with respect to said valve means and defining a point of engagement against which said biasing means arm portion reacts during valve means movement,
   said biasing means normally biasing said valve means into a position offering minimum obstruction to flow through said passage and movement of said valve means in said passage moving the point of engagement against which said biasing means reacts along said arm portion, increased pressure in said passage moving said point of engagement toward said supported portion of said biasing means.

2. The constant volume regulator of claim 1 wherein said biasing means engages said valve means to define said point of engagement.

3. The constant volume regulator of claim 2 wherein said valve means includes a body portion and means supporting said body portion for pivotal movement in said passage to vary the obstruction of said passage:
   means defining an opening in said body portion,
   and said biasing means arm portion extending through said body portion opening to establish the point of engagement between said biasing means arm portion and said body portion.

4. The constant volume regulator of claim 2 wherein said valve means includes a body portion and means supporting said body portion for pivotal movement in said passage to vary the obstruction of said passage,
   and said biasing means arm portion extending toward and intersecting the plane of said body portion along its path of pivotal movement.

5. The constant volume regulator of claim 1 wherein said biasing means comprises a torsion spring having a coiled portion providing said supported portion of said biasing means, an elongated arm portion extending from said coiled portion providing said biasing means arm portion, and means anchoring said coil portion to hold said coil portion against rotation in response to angular movement of said arm portion, said torsion spring and said valve means arranged so that movement of said valve means from said minimum obstruction position to increase the obstruction of said passage displaces said arm portion angularly with respect to said coiled portion.

6. The constant volume regulator of claim 2 wherein said biasing means comprises a torsion spring having a coiled portion providing said supported portion of said biasing means, an elongated arm portion extending from said coiled portion providing said biasing means arm portion, and means anchoring said coil portion to hold said coil portion against rotation in response to angular movement of said arm portion, said torsion spring and said valve means arranged so that movement of said valve means from said minimum obstruction position to increase the obstruction of said passage displaces said arm portion angularly with respect to said coiled portion.

7. The constant volume regulator of claim 6 wherein said valve means includes a body portion and means supporting said body portion for pivotal movement in said passage and with respect to said torsion spring, and roller means supported on and movable with said body portion, and wherein said torsion spring arm portion engages said roller means.

8. The constant volume regulator of claim 5 including control point setting means exposed to said passage and cooperative with the walls of said passage to determine the effective cross sectional area of said passage open to flow, said control point setting means having a plurality of fixed positions in said passage each position providing a different amount of obstruction to flow through said passage and determining a different cross sectional flow area.

9. The constant volume regulator of claim 6 wherein valve means comprises a body portion having an edge presented to flow through said passage and means supporting said body at a point downstream of said edge for pivotal movement in response to variations in pressure across said valve means, relative to the walls of said passage to vary the obstruction to flow through said passage.

10. The constant volume regulator of claim 9 including control point setting means exposed to said passage and cooperative with the walls of said passage to determine the effective cross sectional area of said passage open to flow, said control point setting means having a plurality of fixed positions in said passage each position providing a different amount of obstruction to flow through said passage and determining a different cross sectional flow area.

11. The constant volume regulator of claim 10 including motion retarding means connected to said body portion and operative to retard motion of said body portion in response to exposure of said body portion to abrupt changes of pressure across said valve means.

12. A constant volume flow regulator comprising, in combination:

wall means defining a flow passage, flow control valve means in said flow passage, means supporting said flow control valve means for movement in response to pressure in said passage about an axis extending transversely of the direction of flow through said passage to vary the angular position of said flow control valve means with respect to said wall means and said direction of flow, torsion spring means including a coiled body portion and an elongated arm portion extending from said coiled body portion and terminating in a free and unsupported end, means supporting said torsion spring means with respect to said flow control valve means, and also including means defining a point of engagement against which said arm portion reacts during valve means movement, said flow control valve means, torsion spring means and said point of engagement defining means arranged with respect to each other to maintain continuous engagement of said point of engagement defining means with said arm portion throughout the range of movement of said flow control valve means and with the point of engagement moving on said arm portion away from said unsupported end of said arm portion as said flow control valve means moves in response to increased pressure in said passage, said arm portion being moved angularly with respect to and against the torque of said coiled body portion as said flow control valve means moves in response to increased pressure in said passage, and means holding said coiled body portion against rotation due to said angular movement of said arm portion so that the force applied by said flow control valve means movement through said arm portion is opposed by said coiled body portion.

13. The constant volume regulator of claim 12 wherein said torsion spring coil body portion is removed from said flow control valve means and said arm portion extends to and engages said flow control valve means to thereby define said point of engagement.

14. The constant volume regulator of claim 13 wherein:

said flow control valve means comprises a body portion having an edge presented to flow through said passage, said support means for said flow control valve means engages said body portion and defines said axis at a point downstream of said edge so that movement of said body portion is about said axis and the angular position of said body portion in said passage varies with pressure in said passage, and said arm portion engaging said valve body portion and, in response to an increase in pressure in said passage, the point of engagement between said valve body portion and said arm portion moving toward said coiled body portion and angularly with respect to said coiled body portion.

15. The constant volume regulator of claim 14 including:

motion retarding means connected between said flow control valve means and the walls of said passage and operative to retard motion of said flow control valve means in response to abrupt changes of pressure across said valve means.

16. The constant volume regulator of claim 13 including:

control point setting valve means in said passage in the vicinity of said flow control valve means and cooperating with the walls of said passage to determine the effective cross sectional area of the passage in which said flow control valve means is operating, said control point setting means having a plurality of fixed positions in said passage and in each position providing a different amount of obstruction to flow through said passage and determining a different cross sectional area open to flow.

17. The constant volume regulator of claim 12 wherein:

said flow passage is defined by first and second pairs of generally opposed walls, said flow control valve means is supported for pivotal movement toward and away from said first pair of walls, and including control point setting means disposed in said passage in the vicinity of and generally opposed to said flow control valve means, said control point setting means including a body portion generally spanning said second pair of walls and means connecting said body portion for movement toward and away from said first pair of walls to thereby vary the cross sectional area of the passage in which said flow control valve means is operating.

18. The constant volume regulator of claim 17 wherein:
said body portion of said control point setting means has a free edge and said body portion connecting means supports said body portion for pivotal movement in said passage about an axis spaced from said free edge so that said free edge is movable toward and away from said flow control valve means,
and means defining a sealed connection between said setting point body portion and one of said first pair of walls.

19. The constant volume regulator of claim 18 including means for moving said setting means body portion in said passage to one of a plurality of positions in said passage and further operative to selectively set said setting means body portion in said positions.

20. A constant volume regulator comprising, in combination:
means defining a flow passage,
flow control means in said flow passage responsive to pressure in said passage and operative to maintain a predetermined volume of flow through said passage on the basis of pressure variations in said passage,
and control point setting means for determining the flow volume to be maintained by said flow control means, said control point setting means including an adjustable portion in said passage in the vicinity of said flow control means and means supporting said adjustable portion for movement selectively to one of a plurality of positions in which said adjustable portion offers different amounts of obstruction to flow through said passage and determines different cross sectional areas of said passage open to flow.

21. The constant volume regulator of claim 20 wherein:
said adjustable portion spans opposed portions of said passage and is movable generally toward and away from said flow control means to determine the cross sectional area of said passage in which said flow control means operates.

22. The constant volume regulator of claim 21 wherein:
said passage is defined by first and second pairs of opposed walls,
and said adjustable portion spans one of said pairs of walls and is movable generally toward and away from said other pair of walls in determining said cross sectional area of said passage.

References Cited
UNITED STATES PATENTS
3,111,142   11/1963   Acosta _____ 138—46

WILLIAM F. O'DEA, Primary Examiner
H. M. COHN, Assistant Examiner

U.S. Cl. X.R.
98—41; 137—521